(12) United States Patent
Cable

(10) Patent No.: US 12,018,993 B2
(45) Date of Patent: Jun. 25, 2024

(54) ABSOLUTE PRESSURE TRANSDUCERS HAVING IMPROVED OPERATING TEMPERATURE RANGES

(71) Applicant: Illinois Tool Works Inc., Glenview, IL (US)

(72) Inventor: Shawn S. Cable, Allentown, PA (US)

(73) Assignee: Illinois Tool Works Inc., Glenview, IL (US)

( * ) Notice: Subject to any disclaimer, the term of this patent is extended or adjusted under 35 U.S.C. 154(b) by 22 days.

(21) Appl. No.: 17/691,891

(22) Filed: Mar. 10, 2022

(65) Prior Publication Data

US 2023/0288279 A1   Sep. 14, 2023

(51) Int. Cl.
*G01L 9/00* (2006.01)
*G01L 19/00* (2006.01)
*G01L 19/04* (2006.01)

(52) U.S. Cl.
CPC ........ *G01L 9/0072* (2013.01); *G01L 19/0007* (2013.01); *G01L 19/04* (2013.01)

(58) Field of Classification Search
None
See application file for complete search history.

(56) References Cited

U.S. PATENT DOCUMENTS 11,175,253 B1 * 11/2021 Plöchinger ............... G01N 1/44
2012/0247216 A1 * 10/2012 Ishihara ............. G01L 19/0618
  73/708
2019/0162618 A1 * 5/2019 Kishida ................. G01L 21/30

OTHER PUBLICATIONS

Brooks®CMX Series Heated Digital Capacitance Manometers Installation and Operation Manual X-VAC-CMX-eng Part No. 541B154AAG Jan. 2011.
International Search Report in PCT/US2023/062858, dated Jun. 9, 2023 (13 pages).

* cited by examiner

*Primary Examiner* — Brandi N Hopkins
*Assistant Examiner* — Nigel H Plumb
(74) *Attorney, Agent, or Firm* — McAndrews, Held & Malloy, Ltd.

(57) ABSTRACT

Disclosed example pressure transducers include: an absolute pressure sensor comprising a fluid input and a sensor housing configured to contain a reference pressure, and configured to output a signal representative of a pressure sensed at the fluid input; an outer insulation housing around the sensor housing of the absolute pressure sensor, wherein a volume between the outer insulation housing and the sensor housing comprises a vacuum pressure, wherein the outer insulation housing has a pinch tube configured to allow establishing of the vacuum pressure in the volume when the outer insulation housing is assembled to form the volume, and to seal the vacuum pressure in the volume when the pinch tube is sealed.

19 Claims, 3 Drawing Sheets

ABSOLUTE PRESSURE TRANSDUCERS HAVING IMPROVED OPERATING TEMPERATURE RANGES

FIELD OF THE DISCLOSURE

This disclosure is directed generally to pressure transducers and, more particularly, to absolute pressure transducers having improved operating temperature ranges.

BACKGROUND

Absolute pressure sensors, or absolute pressure transducers, measure the pressure of a fluid input to the sensor in a manner that is not influenced by ambient (e.g., atmospheric) pressures. Absolute pressure sensors are used in, for example, process control systems or other systems in which it is desirable to measure the pressure of a volume.

SUMMARY

Absolute pressure transducers having improved operating temperature ranges are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

Figure 1:
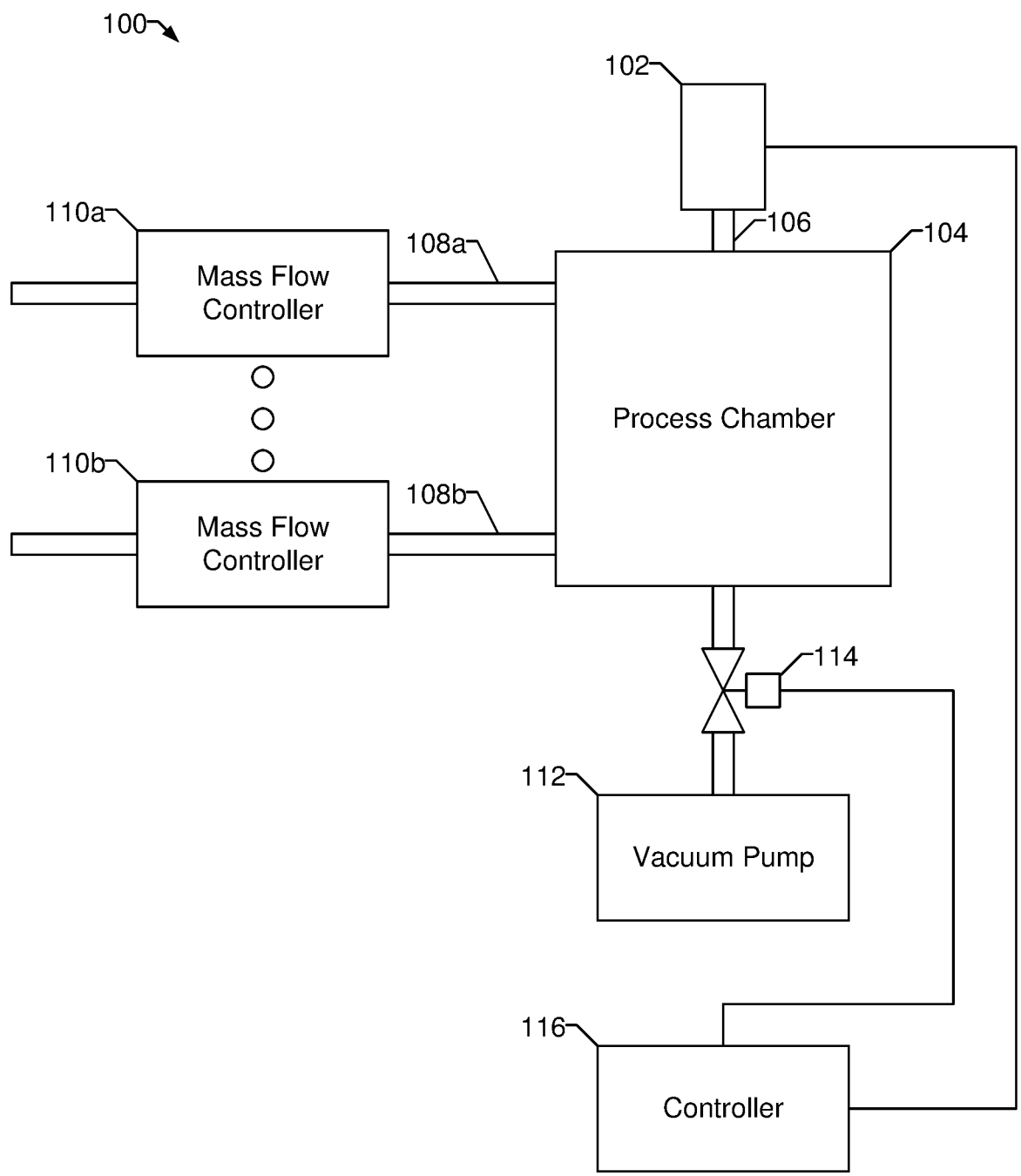
FIG. 1 is a block diagram of an example process control system including an absolute pressure sensor, in accordance with aspects of this disclosure.

For the purpose of promoting an understanding of the principles of the claimed technology and presenting its currently understood, best mode of operation, reference will be now made to the embodiments illustrated in the drawings and specific language will be used to describe the same. It will nevertheless be understood that no limitation of the scope of the claimed technology is thereby intended, with such alterations and further modifications in the illustrated device and such further applications of the principles of the claimed technology as illustrated therein being contemplated as would typically occur to one skilled in the art to which the claimed technology relates.

Some conventional absolute pressure sensors are heated to match or exceed the temperature of the volume or fluid being measured. However, due to the proximity of heat-sensitive circuitry to the measurement apparatus of conventional absolute pressure sensors, the temperature range of conventional absolute pressure sensors may be limited.

Some conventional absolute pressure sensors include insulation materials positioned between the sensor core and the exterior of the sensor and/or between the sensor core and the electronics. However, the inclusion of insulation materials can result in undesirable particle inclusions within the manufacturing area around the absolute pressure sensor.

In contrast with conventional absolute pressure sensors, disclosed example pressure transducers are capable of higher input fluid temperatures with reduced total size or volume. Disclosed example pressure transducers provide a high thermal impedance vacuum insulation between a pressure sensor portion of the pressure transducer and other components, such as sensing and/or communication circuitry. Disclosed examples are compatible with conventional sensing cores, and provide an extended the operating temperature range. In particular, disclosed example pressure transducers omit insulation which can produce undesirable particular matter into the surrounding manufacturing area, and/or reduce the energy involved in heating the sensor core to the desired temperature due to reduced thermal losses.

As used herein, the term "fluid" includes matter in both liquid and gaseous states.

Disclosed example pressure transducers include: an absolute pressure sensor having a fluid input and configured to output a signal representative of a pressure sensed at the fluid input; and an outer insulation housing around the absolute pressure sensor, in which a volume between the housing and the absolute pressure sensor comprises a vacuum pressure.

In some example pressure transducers, the absolute pressure sensor includes a capacitance manometer comprising an internal volume having a vacuum pressure. In some example pressure transducers, the volume between the housing and the capacitance manometer is not in fluid communication with the internal volume of the capacitance manometer.

In some example pressure transducers, the absolute pressure sensor includes one or more inner signal ports configured to output a pressure signal from an interior of the absolute pressure sensor, and the outer insulation housing includes one or more outer signal ports coupled to the one or more inner signal ports, in which the outer signal ports are configured to conduct the pressure signal to an exterior of the outer insulation housing. Some such pressure transducers further include sensing circuitry coupled to the one more outer signal ports. In some such example pressure transducers, the sensing circuitry is attached to a circuit board which is attached to the outer insulation housing. In some such pressure transducers, the outer insulation housing and the vacuum insulate the circuit board and the sensing circuitry from elevated temperatures on the absolute pressure sensor.

In some example pressure transducers, the temperature of the fluid input is more than 160° C., more than 200° C., or more than 250° C. Some example pressure transducers further include a heater within the volume configured to heat the absolute pressure sensor, in which the outer insulation housing includes a heater power port coupled to the heater and is configured to conduct electrical power from an exterior of the outer insulation housing to the heater. In some such examples, the outer insulation housing includes a heater control port coupled to the heater to conduct at least one of a control signal or a temperature measurement signal between an exterior of the outer insulation housing and the heater.

Some example pressure transducers further include a fluid input tube coupled to the absolute pressure sensor and to the outer insulation housing, in which the fluid input tube is configured to deliver fluid to the fluid input. In some example pressure transducers, the fluid input tube and the outer insulation housing hermetically seal the volume. In some example pressure transducers, the fluid input tube and the outer insulation housing are at least one of brazed together, welded together, or integrally constructed.

In some example pressure transducers, the outer insulation housing includes at least one of stainless steel, aluminum, Hastelloy® alloy, Inconel® alloy, or glass. In some example pressure transducers, the outer insulation housing includes a pinch tube. In some example pressure transducers, the vacuum pressure between the housing and the absolute pressure sensor is a sub-atmospheric pressure. In some example pressure transducers, the vacuum pressure between the housing and the absolute pressure sensor is less than 100 torr, less than 1 torr, or less than 0.001 torr.

FIG. 1 is a block diagram of an example process control system 100 including an absolute pressure transducer 102. The example process control system 100 of FIG. 1 includes a process chamber 104, to which the absolute pressure transducer 102 is fluidly coupled via a fluid input line 106 to measure the pressure of the process chamber 104.

The example process chamber 104 may receive one or more inputs, such as process feed materials, via a corresponding number of feed lines 108a, 108b, which may be controlled via mass flow controllers 110a, 110b.

The example system 100 may include a vacuum pump 112, or other pressure control pump, and a valve 114 to control a flow rate between the vacuum pump 112 and the process chamber 104. The valve 114 may be controlled by a controller 116, computing device, and/or any other control technique, to maintain the pressure in the process chamber 104 within a desired range. The example absolute pressure transducer 102 is communicatively coupled to the controller 116 to provide pressure feedback to the controller 116 (e.g., for use in a pressure control loop). For example, as the pressure in the process chamber 104 increases, the absolute pressure transducer 102 measures the pressure and provides a signal representative of the pressure to the controller 116, which then controls the valve 114 to increase the flow rate from the process chamber 104 to the vacuum pump 112. The vacuum pump 112 may have an output to any appropriate location based on the nature of the process.

In contrast with prior process control systems, the example process control system 100 is capable of accurately measuring the pressure of the process chamber 104 with the absolute pressure transducer 102 at process temperatures (e.g., temperatures of the fluid(s) in the process chamber 104) above 160° C., and which may be above 200° C., above 250° C., and/or up to approximately 850° C. Furthermore, the example process control system 100 may require less power to heat the absolute pressure transducer 102 to a given temperature. The example absolute pressure transducer 102 may provide an increased process temperature range with a lower total volume than conventional sensors which use insulation.

Figure 2:
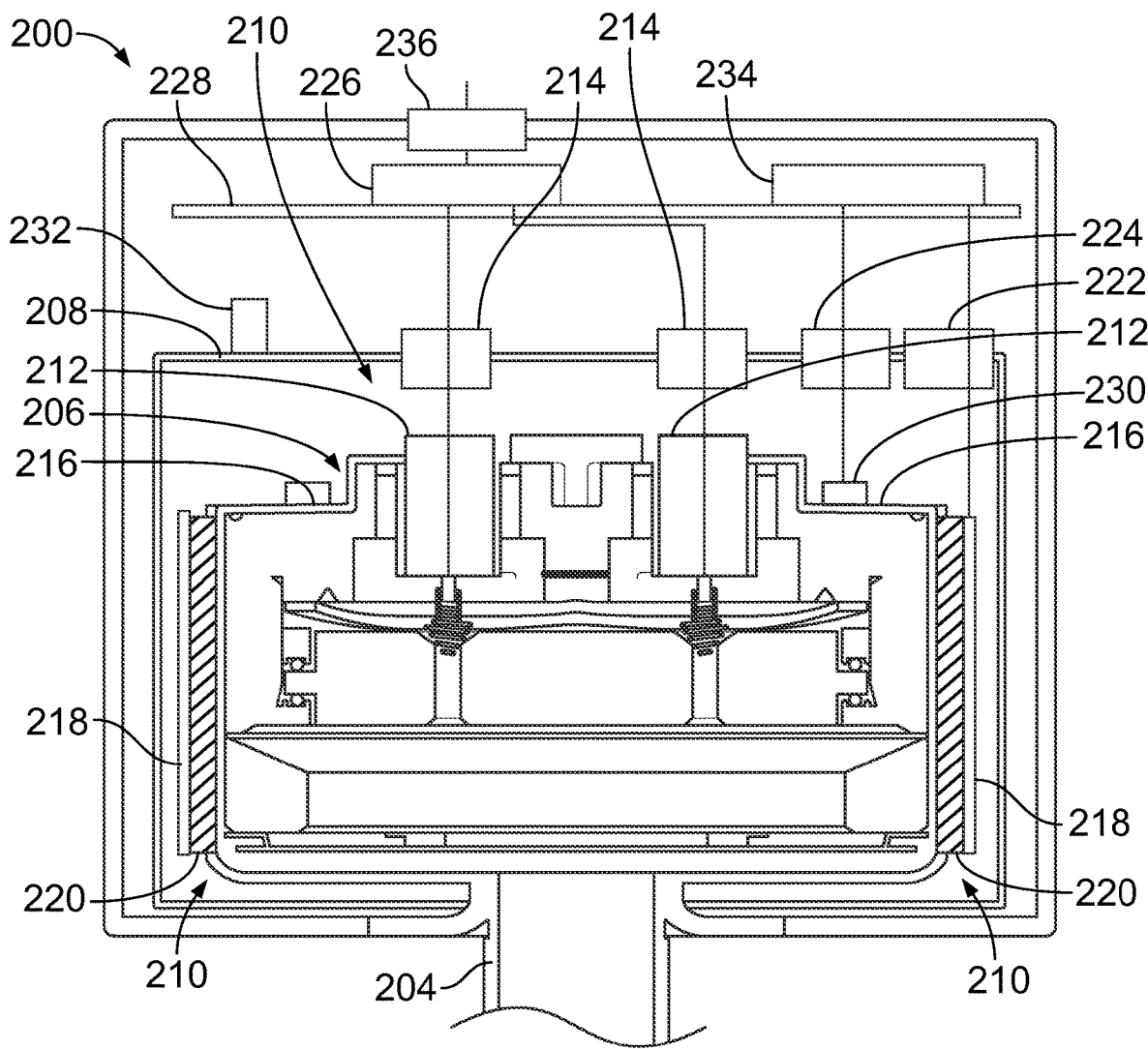
FIG. 2 is a schematic diagram of an example absolute pressure sensor which may be used to implement the absolute pressure sensor of FIG. 1, in accordance with aspects of this disclosure.

FIG. 2 is a schematic diagram of an example absolute pressure sensor 200 which may be used to implement the absolute pressure transducer 102 of FIG. 1. The example absolute pressure sensor 200 receives a fluid via a fluid input line 204 (e.g., the fluid input line 106 of FIG. 1), measures the absolute pressure of the received fluid, and outputs one or more signals representative of the measured pressure.

The example absolute pressure transducer 200 includes an absolute pressure sensor 206 attached to the fluid input line 204. The absolute pressure sensor 206 may also be referred to as the "sensor core," in that the absolute pressure sensor 206 performs the measurements which are converted to output signals. The absolute pressure sensor 206 is at least partially surrounded by an outer insulation housing 208, such that a volume 210 exists between the absolute pressure sensor 206 and the outer insulation housing 208. The volume 210 is provided with a vacuum pressure to thermally insulate the absolute pressure sensor 206 from the outer insulation housing 208. In some examples, the vacuum pressure in the volume 210 is sub-atmospheric pressure (e.g., <760 torr). The thermal insulation provided by the volume 210 improves as the pressure is decreased. In some such examples, the vacuum pressure within the volume 210 is less than 100 torr. The vacuum pressure may be as low as <1 torr, and advantageously is <0.001 torr.

The example outer insulation housing 208 is stainless steel. However, the outer insulation housing 208 may be constructed using aluminum, Hastelloy® alloy, Inconel® alloy, glass, and/or any other material that is capable of being sealed to maintain a vacuum pressure.

In the illustrated example, the absolute pressure sensor 206 is a capacitance manometer, in which a flexible diaphragm is coupled to an electrode. As the pressure at the fluid input line 204 changes relative to a reference pressure (e.g., a vacuum pressure, which may be the same or different as the vacuum pressure in the volume 210), the diaphragm moves and changes the capacitance at the electrode in an amount that is proportional to the pressure at the input fluid line 204. The capacitance signal is output from the absolute pressure sensor 206 via one or more inner signal ports 212, which are coupled to outer signal ports 214 on the outer insulation housing 208 through the volume 210.

The example absolute pressure sensor 206 has one or more sensor housings 216, which contain the reference pressure and the process fluid. In the example of FIG. 2, the volume 210 is not in fluid communication with the reference vacuum pressure internal to the capacitance manometer. The volume 210 is hermetically sealed from the fluid input line 204 and from the interior of the absolute pressure sensor 206. For example, the outer insulation housing 208 may be welded, brazed, or otherwise sealed against the fluid input line 204 and/or against the sensor housings 216 to provide a hermetic seal.

In a similar manner, the inner signal ports 212 may extend through one or more of the sensor housings 216 and are hermetically sealed against the sensor housings 216 to retain the reference pressure within the absolute pressure sensor 206. Similarly, the outer signal ports 214 extend through the outer insulation housing 208 and are hermetically sealed against the outer insulation housing 208 to retain the vacuum pressure in the volume 210. The inner signal ports 212 and the outer signal ports 214 transmit one or more measurement signals (e.g., signals representative of the measured pressure) and zero or more reference signals (e.g., signals representative of a measured reference signal, such as to reduce or eliminate common mode errors present in the one or more measurement signals).

The absolute pressure transducer 200 further includes one or more heaters 218 to increase the temperature of the absolute pressure sensor 206 (e.g., to reduce effects caused by thermal gradients between the components absolute pressure sensor 206 and the process fluid(s)). The example heater 218 may be positioned within the volume 210, such that there is an annular space between the heater 218 and the outer insulation housing 208. In some examples, the heater(s) 218 are controlled to heat the absolute pressure sensor 206 to a setpoint temperature which, in some cases, is at least the expected process temperature. In some examples, the one or more heat spreaders 220 are positioned in contact with the heater(s) 218 and the sensor housing 216 to more effectively distribute heat over a larger area of the absolute pressure sensor 206 and reduce thermal gradients.

To provide power to the heater 218, the absolute pressure transducer 200 includes heater power port(s) 222, which conducts electrical power through the outer insulation housing 208 to the heater 218 through the volume 210. The example transducer 200 may further include heater control port(s) 224, which may conduct a temperature feedback signal from the heater 218 and/or a temperature sensor 230 on the sensor housing 216 and/or provide a control signal to a heater controller 234 which controls the heat generated by the heater 218.

The example absolute pressure transducer 200 further includes sensing circuitry 226 connected to the outer signal ports 214 to receive the measurement signal(s) and/or reference signal(s). The sensing circuitry 226 may correct the measurement signal(s) (e.g., for error detected via the reference signal(s). The corrected measurement signal(s), representative of the measured absolute pressure in the absolute pressure sensor 206, may then be transmitted by the sensing circuitry 226 (e.g., to the controller 116 of FIG. 1, to another control and/or data collection device, etc.) via a communications port 236 (e.g., a connector). In the example of FIG. 2, the example sensing circuitry 226 is mounted within the absolute pressure transducer 200 on a circuit board 228. The outer insulation housing 208 and the vacuum pressure within the volume 110 cooperate to insulate the circuit board 228, the sensing circuitry 226, communications circuitry and/or connectors, and/or any other components outside of the outer insulation housing 208 from the heat within the outer insulation housing 208.

To draw and maintain the vacuum within the volume 210, the example outer insulation housing 208 includes a pinch tube 232 (or pinch-off tube). The pinch tube 232 is in fluid communication with the volume 210. During manufacturing and after sealing of the outer insulation housing 208, the vacuum within the volume 210 is drawn via the pinch tube 232, which is pinched to seal the volume 210 when the desired vacuum level is reached.

Figure 3:
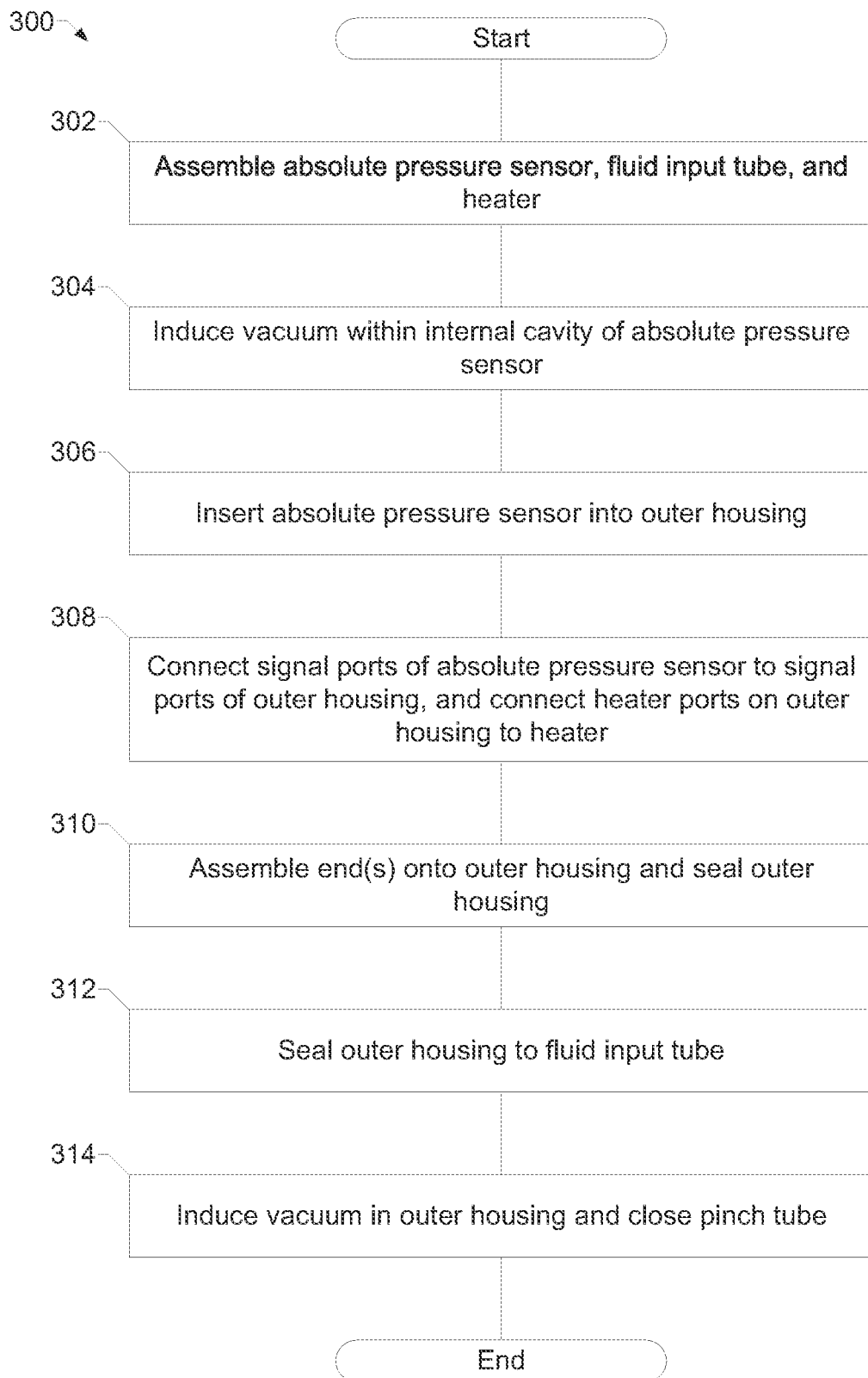
FIG. 3 is a flowchart representative of an example method which may be performed to assemble the example absolute pressure sensor of FIG. 2.

FIG. 3 is a flowchart representative of an example method 300 which may be performed to assemble the example absolute pressure sensor 200 of FIG. 2. While an example manufacturing method is described with reference to FIG. 3, other methods may be used, such as methods involving additive manufacturing and/or other techniques that reduce the number of joining operations to be performed.

At block 302, the pressure sensor 206, the fluid input line 204, and the heater 218 are assembled.

At block 304, a vacuum pressure is induced within the pressure sensor 206 (e.g., within a capacitance manometer).

At block 306, the absolute pressure sensor 206 is inserted into the outer insulation housing 208. Insertion provides for the presence of the volume 210 between the absolute pressure sensor 206 and the outer insulation housing 208.

At block 308, the inner signal ports 212 are connected to the outer signal ports 214 (e.g., on a lid portion of the outer insulation housing 208), and the heater power port(s) 222 are connected to the heater(s) 218. In some examples, the heater control port(s) 224 connect heater circuitry 234 to the temperature sensor 230 on the absolute pressure sensor 206.

At block 310, the end(s) (e.g., lid) is assembled onto the outer insulation housing 208, and the end is sealed onto the outer insulation housing 208. In other examples, any section of the outer insulation housing 208 may be assembled and sealed to form a sealed, enclosed volume 210 around the absolute pressure sensor 206.

At block 312, the outer insulation housing 208 is sealed against the fluid input line 106. For example, sealing may involve welding, brazing, and/or any other hermetic sealing method.

At block 314, a vacuum pressure is induced in the volume 210 (e.g., via the pinch tube 232), and the pinch tube 232 is closed or sealed when the desired pressure is obtained. The example method 300 may then end, and other manufacturing steps may be taken (e.g., attachment and connection of the sensing circuitry 226 and circuit board 228, encasing of the manufactured assembly, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made, and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A pressure transducer, comprising:
   an absolute pressure sensor comprising a fluid input and a sensor housing configured to contain a reference pressure, and configured to output a signal representative of a pressure sensed at the fluid input;
   an outer insulation housing around the sensor housing of the absolute pressure sensor, wherein a volume between the outer insulation housing and the sensor housing comprises a vacuum pressure,
   wherein the outer insulation housing has a pinch tube configured to allow establishing of the vacuum pressure in the volume when the outer insulation housing is assembled to form the volume, and to seal the vacuum pressure in the volume when the pinch tube is sealed.

2. The pressure transducer as defined in claim 1, wherein the absolute pressure sensor comprises a capacitance manometer comprising an internal volume having a vacuum pressure.

3. The pressure transducer as defined in claim 2, wherein the volume between the housing and the capacitance manometer is not in fluid communication with the internal volume of the capacitance manometer.

4. The pressure transducer as defined in claim 1, wherein the absolute pressure sensor comprises one or more inner signal ports configured to output a pressure signal from an interior of the absolute pressure sensor, and the outer insulation housing comprises one or more outer signal ports coupled to the one or more inner signal ports, the outer signal ports configured to conduct the pressure signal to an exterior of the outer insulation housing.

5. The pressure transducer as defined in claim 4, further comprising sensing circuitry coupled to the one more outer signal ports.

6. The pressure transducer as defined in claim 5, wherein the sensing circuitry is attached to a circuit board which is attached to the outer insulation housing.

7. The pressure transducer as defined in claim 6, wherein the outer insulation housing and the volume insulate the circuit board and the sensing circuitry from elevated temperatures on the absolute pressure sensor.

8. The pressure transducer as defined in claim 1, wherein the temperature of the fluid input is more than 160° C.

9. The pressure transducer as defined in claim 1, wherein the temperature of the fluid input is more than 200° C.

10. The pressure transducer as defined in claim 1, wherein the temperature of the fluid input is more than 250° C.

11. The pressure transducer as defined in claim 1, further comprising a heater within the volume configured to heat the absolute pressure sensor, the outer insulation housing comprises a heater power port coupled to the heater and configured to conduct electrical power from an exterior of the outer insulation housing to the heater.

12. The pressure transducer as defined in claim 11, wherein the outer insulation housing comprises a heater control port coupled to the heater to conduct at least one of a control signal or a temperature measurement signal between an exterior of the outer insulation housing and the heater.

13. The pressure transducer as defined in claim 1, further comprising a fluid input tube coupled to the absolute pressure sensor and to the outer insulation housing, the fluid input tube configured to deliver fluid to the fluid input.

14. The pressure transducer as defined in claim 13, wherein the fluid input tube and the outer insulation housing hermetically seal the volume.

15. The pressure transducer as defined in claim 14, wherein the fluid input tube and the outer insulation housing are at least one of brazed together, welded together, or integrally constructed.

16. The pressure transducer as defined in claim 1, wherein the outer insulation housing comprises at least one of stainless steel, aluminum, Hastelloy® alloy, Inconel® alloy, or glass.

17. The pressure transducer as defined in claim 1, wherein the vacuum pressure between the housing and the absolute pressure sensor is a sub-atmospheric pressure.

18. The pressure transducer as defined in claim 1, wherein the vacuum pressure between the housing and the absolute pressure sensor is less than 100 torr.

19. The pressure transducer as defined in claim 1, wherein the vacuum pressure between the housing and the absolute pressure sensor is less than 0.001 torr.

* * * * *